June 15, 1926. Re. 16,364
G. B. DOREY
FRICTION DRAFT RIGGING
Original Filed Jan. 9, 1922
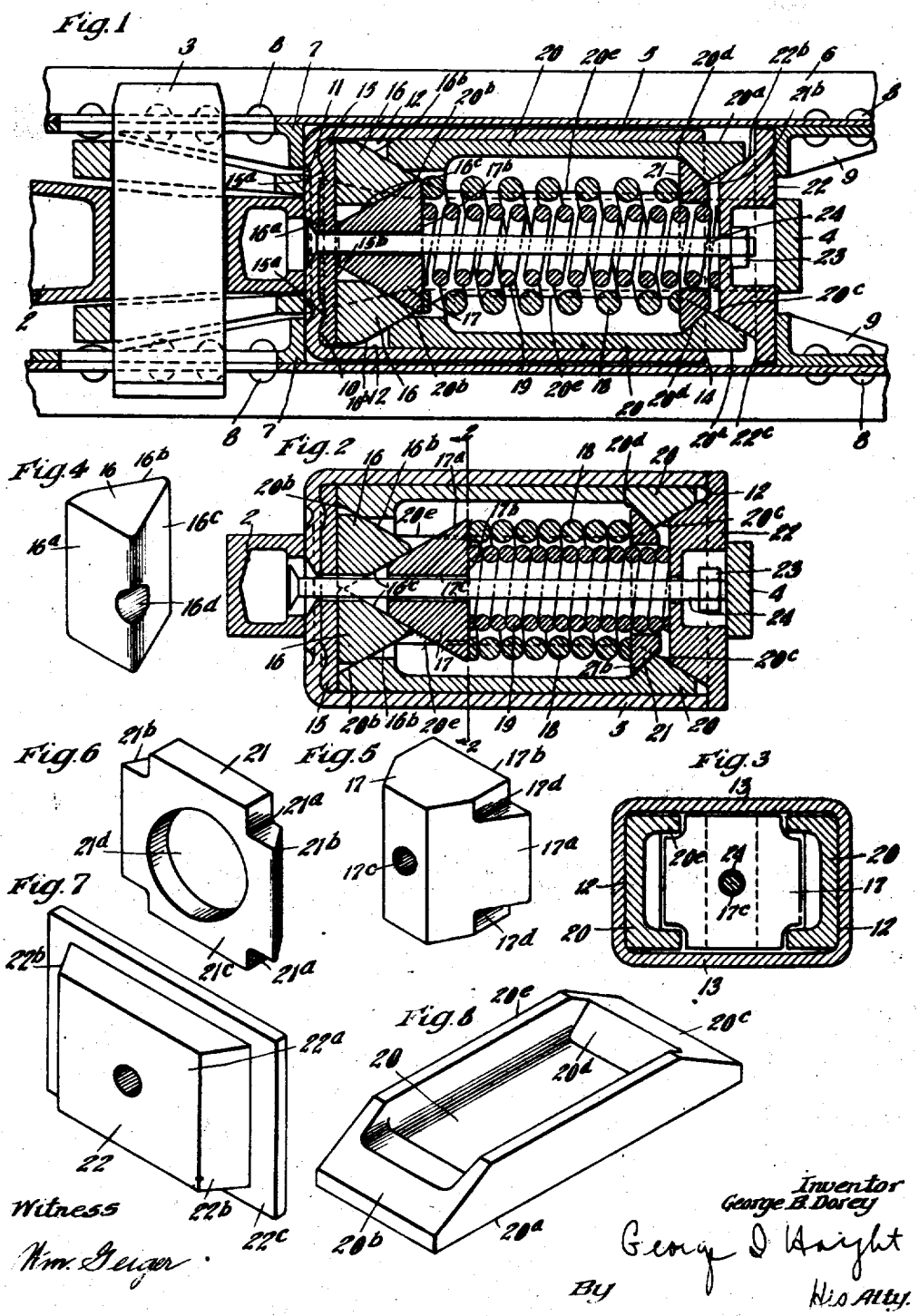
Witness
Wm. Geiger
Inventor
George B. Dorey
By George D. Wright
His Atty.

Reissued June 15, 1926. Re. 16,364

UNITED STATES PATENT OFFICE.

GEORGE BINET DOREY, OF EVANSTON, ILLINOIS, ASSIGNOR, BY MESNE ASSIGNMENTS, TO W. H. MINER, INC., A CORPORATION.

FRICTION DRAFT RIGGING.

Original No. 1,493,192, dated May 6, 1924, Serial No. 528,010 filed January 9, 1922. Application for reissue filed February 15, 1926. Serial No. 88,507.

My invention relates to improvements in frictional draft riggings as applied to railway cars and the like and has particular reference to that type wherein casings are used in connection with wedging elements to secure high resistance and great cushioning power.

One of the main objects of my invention is to provide a draft rigging wherein friction shoes engage the side walls of a casing and are movable relatively thereto.

Another object of my invention is to dispose the various frictional elements in the casing in order that those which have the greatest transverse thrust will be in the bottom of the casing, thereby securing the full benefit of the cohesion between the end walls and side walls of the casing to prevent rupture of this member.

A further object of the invention is to provide a removable wear plate between the casing end wall and the friction element.

It is also an object of the present invention to provide a friction draft rigging having a casing with friction shoes in engagement with the side walls thereof and to provide means whereby these shoes will function in unison. Hitherto when friction shoes which have been widely separated from each other have been employed in this manner there has been a tendency for one shoe to move past the other and so impair the efficiency of the rigging. In my invention this deficiency has been overcome by providing at one end of the shoes non-contractible members which extend from one shoe to the other and exert longitudinal as well as transverse pressure thereon.

Provision has also been made to ensure the certain release of the frictional elements after compression.

With these ends in view and other details of novelty such as will be more particularly pointed out hereinafter, my invention resides in the peculiar construction, arrangements and combinations of parts as hereinafter set forth.

For a fuller comprehension of my invention, reference must be had to the accompanying drawings wherein like references indicate like parts.

In the drawings forming a part of this specification, Figure 1 is a horizontal, longitudinal, sectional view of a railway draft rigging, showing my improvements in connection therewith.

Figure 2 is a horizontal, longitudinal sectional view of the rigging showing the same in the fully compressed position with the follower member abutting on the casing.

Figure 3 is a transverse sectional view of the rigging taken on the line 2—2 of Figure 2.

Figure 4 is a perspective view of one of the transversely and longitudinally movable members known as wedge blocks.

Figure 5 is a perspective view of the central wedge block.

Figure 6 is a perspective view of the combined spring seat and spreader member.

Figure 7 is a perspective view of the follower member.

Figure 8 is a perspective view of one of the friction shoes.

In the drawings, 2 represents the drawbar of the coupler connected by means of key 3 to the yoke 4 in the usual manner, the yoke embracing casing 5 and the whole being located between the center sills 6—6. In the illustration the casing is formed to abut against front stops 7 secured to the center sills by means of rivets 8, rear stops 9 also secured to the center sills in like manner constitute draft gear abutments under buffing strains.

The casing 5 is preferably formed of rectangular section with one end closed and the other end open, the bottom wall 10 being reinforced with a corrugation 11, extending in the form of a circle and providing a very rigid member for the purpose of sustaining the strain due to coupler shocks. A friction plate 15 is fitted in the bottom of the casing and is formed with a recessed portion corresponding to the corrugation in the casing and designated as $15^a$ while the outer surface of the plate as at $15^b$ is made to act as a friction surface. In this manner as the plate wears away it may be readily renewed without the necessity of discarding the entire casing. The side walls of the casing constitute friction surfaces as at 12 and register with surfaces of the friction shoes in a manner to be hereinafter explained while the top and bottom walls 13 serve as ties to prevent rupture of the casing incidental to the transverse thrust caused by the frictional elements. The outer edge of the casing walls as at 14 serves as an abutment for the follower member when the gear is fully compressed, thereby relieving the frictional elements of undue strain. The surface $15^b$ of the friction plate 15 registers with the surfaces $16^a$ of the wedge blocks 16. The latter members are each formed with three bearing surfaces as shown in Figure 4, the wedge surfaces $16^c$ being adapted to co-act with wedge surfaces $17^a$ of the central wedge member 17 which is disposed between the wedge blocks 16 and adapted to be moved in a longitudinal direction. The surface $17^b$ forms an abutment for the outer spring 18 and also for the inner spring 19. A hole $17^c$ is provided in the central wedge member for the passage of the bolt 24 which extends longitudinally throughout the gear. A recess is also provided in the wedge blocks 16 as shown at $16^d$ for the purpose of providing clearance for the central bolt when the wedge blocks have moved transversely towards each other as shown in Figure 2.

Friction shoes 20 are disposed on each side of the casing 5 within this member and surfaces $20^a$ of these shoes co-act with surfaces 12 of the casing. The inner ends of the shoes are formed with inclined surfaces $20^b$ adapted to register with surfaces $16^b$ of the wedge blocks 16. The outer ends of the shoes are formed with oppositely inclined surfaces $20^c$ and $20^d$ which are connected with the other end of the shoes by means of flanges $20^e$ serving to reinforce the shoes against bending. The central wedge blocks 17 have the corners recessed as at $17^d$ for the purpose of providing clearance at the flanged portion of the shoes.

A spring seat 21 extending from shoe to shoe is formed with wedging surfaces $21^b$ adapted to register with similarly inclined surfaces of the shoes as at $20^d$. The corners of the spring seat are recessed to provide clearance for the flanged portion of the shoes, such recesses being designated as $21^a$. The flat surface $21^c$ forms an abutment for the outer spring 18 while the inner spring 19 extends longitudinally through the member 21 passing through the hole $21^d$ formed therein for this purpose and abuts against the surface $22^a$ of the follower member 22. The follower member is preferably formed to act as a spreader through the agency of the sloping surfaces $22^b$ which register with the inclined surfaces $20^c$ of the shoes. The surface $22^c$ is preferably made flat to form a solid abutment on the casing edge at 14. A hollowed out portion is formed in the follower member for the reception of the nut 23 whereby the bolt 24 serves to retain the gear in its assembled relation.

The operation of the draft rigging takes place as follows: In draft or buffing strains the draft rigging is compressed by the approach of the follower member 22 to the casing 5. This movement causes the friction shoes 20 to be moved inwardly into the casing, and by reason of the contact between the inclined walls $20^b$ and the wedge blocks 16, the latter members will be moved transversely toward each other, displacing the central wedge member 17 in a direction opposite to the movement of the shoes, thereby compressing the springs from the closed end of the casing. The transverse reaction due to this wedging action forces the shoes in close frictional engagement with the casing walls, which action is further augmented by the follower member 22 and spring seat 21, inasmuch as both of these members are formed with inclined bearing surfaces which register with similarly inclined bearing surfaces on the shoes.

As the shoes move inwardly in the casing, the spring seat 21 moves in unison therewith, thereby compressing the spring in the same ratio, and consequently it will be seen that the spring is compressed from both ends of the gear at the same time. The outward thrust is always maintained on the shoes by this outer spring 18, inasmuch as there is always a certain amount of initial compression in the spring which serves to give great shock absorbing capacity from the very start of the compression movement. This outward thrust is also exerted by the wedging action of the follower member 22 through the medium of the inclined walls $22^b$ bearing on the inclined walls $20^c$ of the shoes.

On the maximum compression being reached, the follower member abuts on the edge 12 of the casing 5, thereby greatly relieving the friction elements of excessive strain.

With the intrduction of large bearing areas in draft riggings, it has become a matter of frequent occurrence for some of the members to bind, owing to some of the various elements having varying degrees of roughness in the friction surfaces and so permit the other frictional elements to move past the others. In this particular invention provision has been made to guard against such a possibility by guiding the central wedging member and preventing any sidewise movement thereof. Any unusual displacement of any of the parts would immediately be reflected by a sidewise movement of this member and consequently special provision has been made to cause it to travel at all times in a straight line, by having the guide flanges $20^e$ of the shoes fit in the corners of the wedge member at $17^d$ and also through the medium of the bolt 24 which passing through the entire mechanism serves to centralize the member 17.

Special provision has also been made to cause the shoes to move in unison by exerting outward pressure thereon at the opposite ends thereof at three distinct places, the compressible mechanism exerting pressure thereon at the outer end and the opposed wedging surfaces of the spring seat and the follower exerting pressure thereon at two distinct places at the inner end thereof.

On release of the mechanism the inner spring 19 moves the follower member out of engagement with the shoes and at the same time the pressure of the outer spring exerted through the spring seat moves the shoes bodily forward. During this action, the compressible mechanism at the other end of the casing is also expanded outwardly, reacting against the inclined surfaces of the shoes and thereby assisting the return movement of the parts.

While I have herein shown and described what I now consider to be the preferred embodiment of the invention, the same is merely illustrative, and I contemplate all changes and modifications which come within the scope of the appended claims.

I claim:

1. In a friction shock absorbing mechanism, the combination with a friction shell; of longitudinally disposed friction shoes co-acting with said shell; wedge pressure transmitting means co-acting with the opposite ends of said shoes, said wedge pressure transmitting means at one end of said shoes including a pair of wedge members co-acting respectively with the inner and outer wedge faces at the corresponding ends of said shoes; and a spring resistance interposed between the wedge pressure transmitting means at one end of the mechanism and the wedge member co-acting with the inner faces of the shoes.

2. In a friction shock absorbing mechanism, the combination with a friction shell; of longitudinally disposed friction shoes co-acting with said shell, each of said shoes having an outer wedge face at one end thereof, outer and inner wedge faces at the opposite end thereof; wedge pressure transmitting means at opposite ends of the mechanism, including wedge members co-acting respectively with the outer and inner wedge faces of said shoes; and a spring resistance co-acting with said wedge pressure transmitting means.

3. In a friction shock absorbing mechanism, the combination with a shell; of longitudinally disposed friction elements co-acting with said shell, each of said elements being provided with outer wedge faces at the opposite ends thereof, each of said elements also having an inner wedge face thereon at one end thereof; wedge pressure transmitting means at opposite ends of the mechanism co-acting respectively with the outer faces of each of said shoes; a wedge member co-acting with the inner faces of said shoes; and a spring resistance interposed between the wedge pressure transmitting means at one end of the mechanism and the wedge member.

4. In a friction shock absorbing mechanism, the combination with a friction shell; of longitudinally disposed friction elements co-acting with said shell, each of said elements being provided with outer wedge faces at the opposite ends thereof, each of said elements also having an inner wedge face at one end thereof; a pair of wedge blocks at one end of the mechanism having wedge faces co-acting with the outer wedge faces at one end of said shoes; a wedge member co-acting with the outer wedge faces at the other end of said shoes; a spring follower having wedge faces co-acting with said wedge blocks; a second spring follower having wedge faces co-acting with the inner wedge faces of said shoes; a spring resistance element interposed between said followers; and a second spring resistance element interposed between said wedge member and one of said followers.

5. In a friction draft rigging, the combination with a casing including an end wall having a raised portion formed therein; of a plate adapted to present on one side a recessed portion to fit over the said raised portion of the casing and presenting on the opposite side a bearing surface for frictional elements.

6. In a friction shock absorbing mechanism, the combination with a compressible mechanism including a central wedge member; of friction shoes adapted to co-act upon said compressible mechanism and displace the central wedge member, said shoes having flanges thereon and said wedge member having the corners recessed to provide clearance for the flanges of said shoes.

7. In a friction shock absorbing mechanism, the combination with a casing; of a spring resistance comprising a plurality of springs, friction shoes co-acting with said casing; and oppositely disposed non-compressible wedging members at one end of said shoes operating to force the shoes outwardly against the casing walls, one of said wedging members being adapted to form an abutment for one of said springs and operating to resist inward movement of the shoes, said member having an opening formed therein permitting another of said springs to extend outwardly therethrough and resist inward movement of the other wedging member.

8. In a friction shock absorbing mechanism, the combination with a friction shell; of a plurality of friction shoes co-acting with the shell, said shoes having wedge faces at opposite ends thereof; a wedge pressure transmitting member co-acting with the wedge faces at one end of the shoes; a plurality of auxiliary wedge blocks co-acting with the wedge faces at the other end of said shoes; a spring seat having wedge faces thereon co-acting with said auxiliary wedge blocks; and a spring resistance interposed between the wedge pressure transmitting member and the spring seat.

9. In a friction shock absorbing mechanism, the combination with a friction shell having a plurality of longitudinally extending interior friction surfaces; of a plurality of friction shoes co-acting with said shell friction surfaces, said shoes having wedge faces at the opposite ends thereof; a wedge pressure creating means, said wedge pressure creating means including a plurality of wedge members disposed at opposite ends of said shoes, certain of said wedge members having wedge faces co-acting respectively with the wedge faces at the opposite ends of the shoes; and a spring resistance interposed between the wedges at the opposite ends of the shoes.

10. In a friction shock absorbing mechanism, the combination with a friction shell having a plurality of longitudinally extending interior friction surfaces; of a spring resistance; a plurality of friction shoes co-acting with said shell friction surfaces, said shoes having wedge faces at the opposite ends thereof; a pressure transmitting member having wedge faces co-acting with the wedge faces at one end of said shoes; a plurality of wedge blocks each having a plurality of wedge faces, certain of which co-act with the wedge faces at the other end of said shoes; and a wedge member interposed between said blocks and co-acting with the remaining wedge faces thereof.

11. In a friction shock absorbing mechanism, the combination with a friction shell having a plurality of longitudinally extending friction surfaces and a transversely extending rear friction surface; of a plurality of friction shoes co-acting with said longitudinally extending surfaces; a plurality of wedge blocks sliding on said transversely extending surface, said blocks and shoes being provided with co-acting wedge faces; a wedge pressure transmitting member, said member and shoes having co-acting wedge faces; a spring follower co-acting with said wedge blocks; and a spring resistance interposed between said member and said follower.

12. In a friction shock absorbing mechanism, the combination with a friction shell having a plurality of interior friction surfaces; of a plurality of friction elements co-acting with said shell friction surfaces, said elements having co-acting wedge faces; a wedge pressure transmitting means adapted to engage certain of said elements and move the same longitudinally of the shell, thereby moving the remaining elements toward each other transversely of the shell; and yielding means opposing movement of said last-named elements toward each other.

13. In a friction shock absorbing mechanism, the combination with a friction shell having a plurality of interior friction surfaces, said surfaces extending both longitudinally and transversely of the shell; of a spring resistance; a plurality of friction shoes co-acting with said shell friction surfaces; pressure transmitting means for effecting movement of certain of said shoes longitudinally of the shell, said last-named shoes and pressure transmitting means having co-acting wedge faces; and co-operating means on said last-named shoes and the remaining shoes for effecting movement of the latter transversely of the shell.

14. In a friction shock absorbing mechanism, the combination with a friction shell having interior friction surfaces; of a spring resistance; a wedge acting spring follower; a plurality of wedge friction shoes co-acting with said shell friction surfaces and movable inwardly of the same during compression of the mechanism; a pressure transmitting means cooperating with said spring resistance adapted to move said shoes inwardly of the shell; and wedge blocks disposed on opposite sides of the mechanism, said blocks being interposed between said spring follower and wedge shoes, whereby the spring follower is moved toward said means during the compression of the mechanism.

In witness that I claim the foregoing, I have hereunto subscribed my name, this 14th day of April, 1926.

GEORGE BINET DOREY.